March 22, 1927.                                                         1,622,075
A. ATWATER
COOKING UTENSIL
Filed Aug. 15, 1925
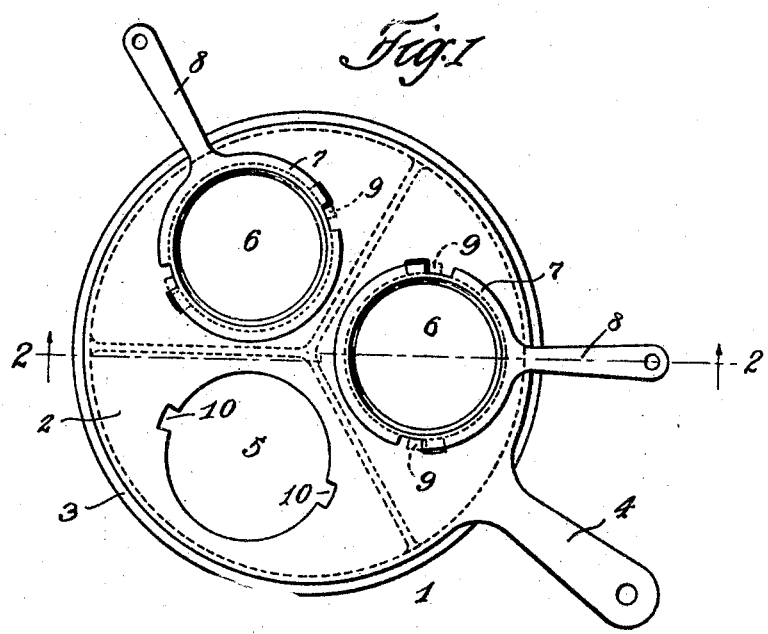
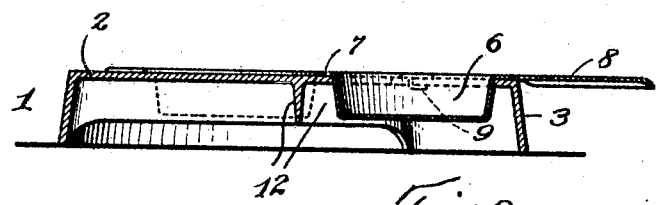
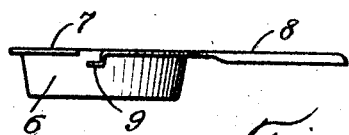
Inventor
Anna Atwater
By Hull, Brock & West
Attys.

Patented Mar. 22, 1927.                                              1,622,075

UNITED STATES PATENT OFFICE.

ANNA ATWATER, OF LAKEWOOD, OHIO.

COOKING UTENSIL.

Application filed August 15, 1925. Serial No. 50,391.

This invention relates to an improved cooking utensil that is especially adapted for use by small families or on occasions when small quantities of a number of different kinds of foods are to be cooked or warmed, and it has especial value when used with gas or oil stoves because it effects a conservation of heat. Also, it occupies a relatively small space on the top of a stove, leaving the remainder of the stove top available for other uses; and it is a labor saving device because it is much more readily handled than a number of individual cooking vessels, and may be washed with greater ease.

My improved cooking utensil, generally, is comprised of a hollow base having a flat top provided with a number of openings that are adapted to be occupied by individual cooking vessels that are in the nature of small frying pans and which incorporate means for detachably connecting them to the base so that in the handling of the utensil there is no danger of the vessels becoming accidentally dislodged.

The objects in view are the production of a cooking utensil of the foregoing nature that is comparatively simple of construction; that is economical of manufacture; that is especially convenient of use; and that is so designed that when one or more of the vessels is or are removed from the base, the remaining vessel or vessels is or are not robbed of its or their due apportionment of heat.

The foregoing objects, with others hereinafter appearing, are attained in the construction illustrated in the accompanying drawing wherein Fig. 1 is a plan view of my improved cooking utensil with one of the cooking vessels removed from the base; Fig. 2 is a section on the line 2—2 of Fig. 1; and Fig. 3 is a side elevation of one of the cooking vessels.

The base, which is designated generally by the reference numeral 1, is comprised of a flat top 2 that is surrounded by a depending flange 3. The base is preferably circular in plan and from one side of it projects a handle 4.

Within the top 2 are a number of openings 5 which are adapted to be occupied by cooking vessels 6 that are in the nature of small frying pans having peripheral flanges 7 and handles 8. The flanges 7 are preferably flush with the tops of the vessels, and diametrically opposite portions of the flanges are offset downwardly to provide hooks 9. The vessels 6 are of a size and shape to fit within and close the openings 5, and notches 10 that are located at diametrically opposite points of the openings 5 receive the hooks 9 when the vessels are placed within the openings. In placing a vessel within an opening it is grasped by the handle 8 and lowered with the hooks 9 in register with the notches 10. When the flange 7 rests upon the top 2, the vessel is rotated slightly by means of a handle 8 to project the hooks 9 beneath adjacent portions of the top.

Ribs 12 divide the interior of the base 1 into compartments corresponding in number and location to the openings 5, the ribs serving also to strengthen the base and prevent its warping or cracking from expansion and contraction effected by the rapid changes in temperature to which a utensil of this sort is subjected in use.

With respect to the production of my improved cooking utensil, the base 1 may be cast from suitable metal, such as iron or aluminum, while the vessels 6 may be stamped from sheet metal, such as sheet steel or aluminum, although it is obvious that these vessels may also be cast. When formed from sheet metal, the body portion of the vessel is drawn downwardly to the desired depth from the plane of the flange 7; the handle 8 is formed with a flanged edge; and diametrically opposite portions of the flange 7 are struck downwardly to form the hooks 9.

In the use of the utensil, it is placed on a stove top or over a burner, and the vessels 6 are deposited within the openings 5. Different foods may be cooked or warmed in the respective vessels, and if one vessel is removed, the draft through the vacant opening 5 will not affect the heat which is delivered to the remaining vessels because of the fact that the ribs 12 pocket the heat surrounding the other vessels and prevent its too rapid escape. By having the top 2 perfectly flat and unobstructed, vessels larger than an opening 5 may be placed on a vacant opening, such for example, as a coffee or tea pot. For the same reason, the top may be very conveniently scraped and cleaned.

Having thus described my invention, what I claim is:—

1. As a new article of manufacture, a utensil consisting of a member that is adapted to be positioned over and shiftable with respect to a burner, said member having a flat unobstructed top and a depending peripheral flange whose lower edge is in a plane parallel with the top, and ribs on the underside of the top dividing the space enclosed by the peripheral flange into a plurality of independent compartments, the lower edges of said ribs being substantially parallel with and spaced above the plane of the lower edge of said flange, the top having openings registering with said compartments.

2. As a new article of manufacture, a utensil consisting of a member that is adapted to be positioned over and shiftable with respect to a burner, said member having a flat unobstructed top and a depending peripheral flange whose lower edge is in a plane parallel with the top, and ribs on the underside of the top dividing the space enclosed by the peripheral flange into a plurality of independent compartments, the lower edges of said ribs being substantially parallel with and spaced above the plane of the lower edge of said flange, the top having an opening registering with each of said compartments and provided with means for positioning a cooking vessel in given relation to each opening.

3. As a new article of manufacture, a utensil consisting of an integral casting having a flat unobstructed top and a depending peripheral flange whose lower edge is in a plane parallel with the top, ribs on the underside of the top dividing the space enclosed by the peripheral flange into a plurality of independent compartments, the lower edges of said ribs being parallel with and spaced above the plane of the lower edge of said flange, the top having openings registering with the compartments, and a handle projecting laterally from the peripheral flange and having its upper surface in the plane of the top.

In testimony whereof, I hereunto affix my signature.

ANNA ATWATER.